Patented May 24, 1949

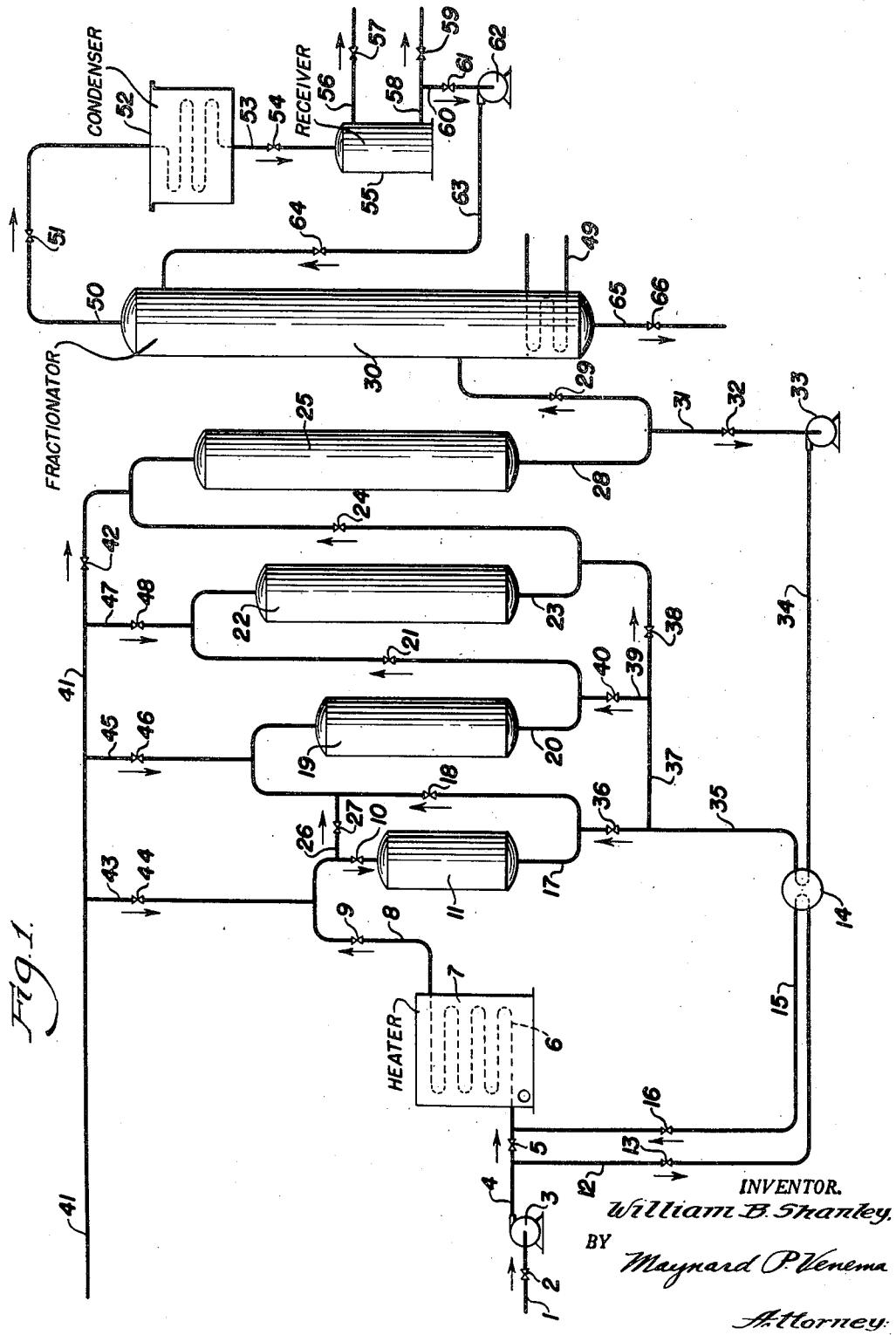

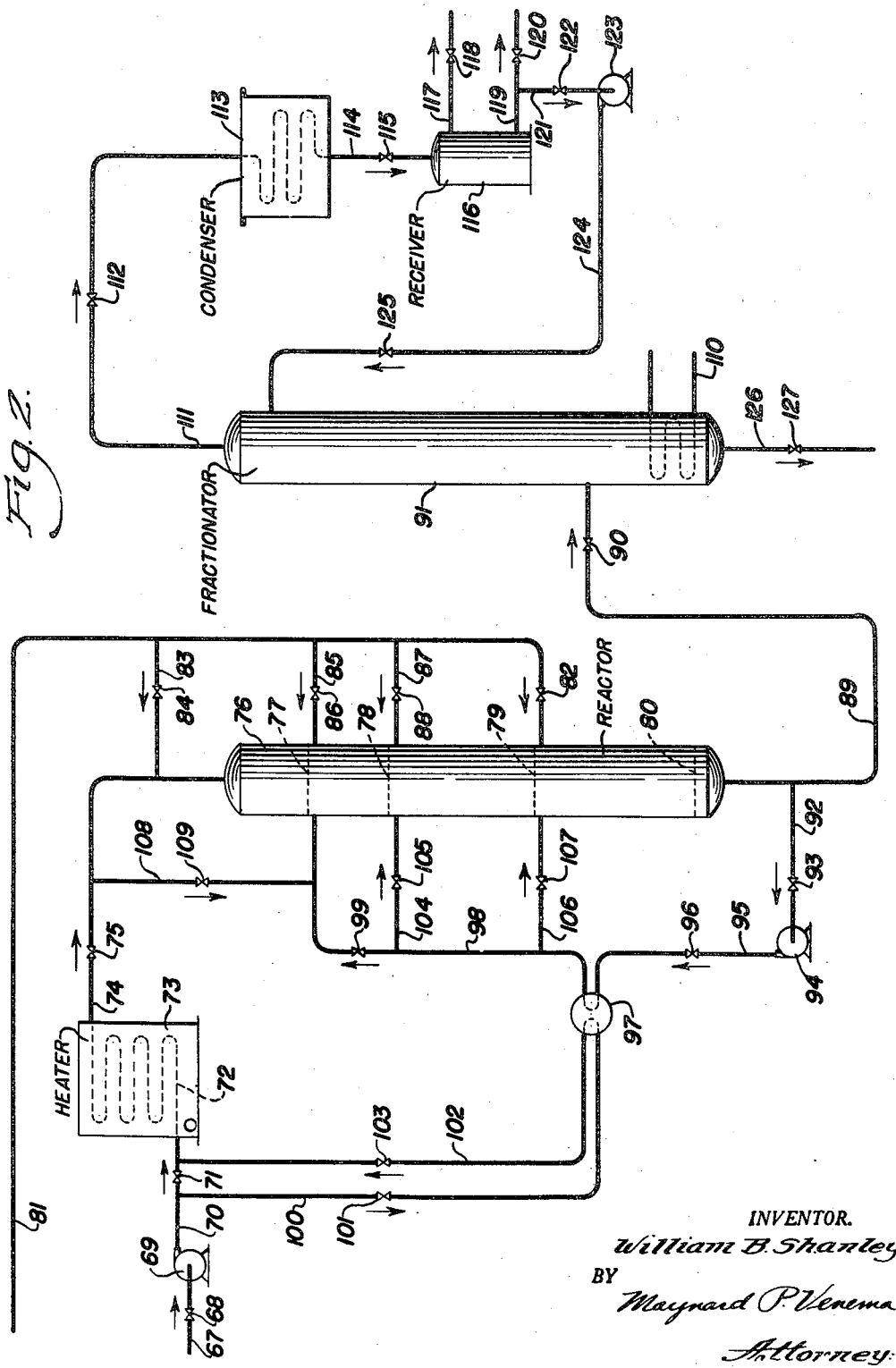

2,470,904

UNITED STATES PATENT OFFICE 2,470,904

POLYMERIZATION OF OLEFINIC HYDROCARBONS

William B. Shanley, San Marino, Calif., assignor to Universal Oil Products Company, Chicago, Ill., a corporation of Delaware Application April 23, 1947, Serial No. 743,425

14 Claims. (Cl. 260—683.15)

1

This invention relates to a process for polymerizing olefinic hydrocarbons and particularly for converting normally gaseous olefinic hydrocarbons into liquid hydrocarbons utilizable directly as high antiknock constituents of motor fuel or hydrogenatable to substantially saturated hydrocarbons which may be employed as components of motor fuels which are required to be of a substantially saturated character such as aviation gasoline.

In a more specific sense, the invention is concerned with improvements in the catalytic polymerization processes operated in conjunction with petroleum cracking plants to produce valuable motor fuel from the gases formed incidental to cracking operations.

Polymerization of olefin-containing gases is carried out commercially by both thermal and catalytic means. The former method which is operated at relatively high temperatures and pressures give substantial yields of aromatic hydrocarbons as well as olefins, while the catalytic polymerization is operated at much lower temperatures and generally at lower pressures to produce an olefinic liquid product. In the catalytic process a type of catalyst which has been used with commercial success is the solid phosphoric acid catalyst such as described in U. S. Patent No. 1,993,513 and others. In this process, olefin-containing hydrocarbon gas mixtures are passed through stationary beds or sections of granular material consisting essentially of prepared particles made by incorporating a phosphoric acid with a relatively inert and generally siliceous material to produce a paste which is either calcined to produce a cake that is ground and sized to recover the catalyst particles or the paste is extruded to produce particles which are later calcined. In either case prepared particles are subjected to controlled drying operations to vary the proper composition of active polymerizing acid in respect to its degree of hydration.

In commercial use, it is customary to operate with a number of polymerizing chambers of substantially the same size filled with substantially the same volume of this type of polymerizing catalyst. It is also customary to operate such catalyst towers in series or in parallel and to partially cool the effluent from one reactor before charging it to the next reactor in the series in order to prevent the exothermic heat of reaction from causing an excessive rise in temperature which may result in dehydration and coking of the catalyst.

Obviously, there is a pressure drop along the line of flow through the series of catalyst reactors and this pressure drop is another factor which must be considered in a successful operation of such a plant to produce high yields of desired products. The present process is an improvement in processes for polymerizing normally gaseous olefin hydrocarbons to form liquid polymers therefrom while utilizing solid granular catalyst, particularly the solid phosphoric acid catalyst described briefly hereinbefore, although the improved process will find ready application when other solid polymerizing catalysts are employed, such as copper pyrophosphate, activated clays, silica-alumina composites, and other composites of silica with alumina and zirconia, thoria, magnesia, and the like.

One specific embodiment of this invention relates to an olefin polymerization process which comprises contacting an olefin-containing hydrocarbon fraction at polymerizing conditions in the presence of a solid polymerizing catalyst contained in a series of catalyst sections of increasing thickness in the direction of flow, cooling between catalyst sections by recycling thereto a portion of the total effluent from said catalyst sections including unconverted olefin-containing fraction and polymers, separating the unrecycled effluent into polymers and unconverted hydrocarbons, and recovering said polymers.

Another embodiment of this invention relates to an olefin polymerization process which comprises contacting an olefin-containing hydrocarbon fraction at polymerizing conditions of temperature and pressure in the presence of a solid phosphoric acid catalyst contained in a plurality of catalyst sections of progressively increasing thickness in the direction of flow, cooling between catalyst sections by recycling thereto a portion of the total effluent from said catalyst sections including unconverted olefin-containing fraction and polymers, separating the unrecycled effluent into polymers and unconverted hydrocarbons, and recovering said polymers.

A chamber-type polymerization plant provides a low cost method of converting normally gaseous olefins into normally liquid hydrocarbons of gasoline boiling range. A plant of this type is particularly suitable for the polymerization treatment of charging stocks containing up to about 35 mole per cent of propylene and butylenes. Other olefin-containing fractions such as are frequently produced by catalytic cracking of hydrocarbon oils contain from about 50 to about 60 mole per cent of olefins of higher molecular weight than ethylene.

Temperature control during polymerization of olefin-containing feed stocks containing 50 to 60 per cent of olefins is relatively difficult in a chamber-type polymerization unit by the methods used heretofore because of the high exothermic heat of the polymerization reaction. In order to maintain a temperature of from about 400 to about 500° F. in a chamber-type polymerization reactor, it is necessary to limit the olefin content of the charged hydrocarbon fraction to between about 15 and about 35 per cent and preferably from between 20 to 25 per cent. When charging stocks are produced which contain more than 35 per cent of polymerizable olefins, temperature control is generally effected by recycling a portion of the substantially deolefinized exit gas such as propane-butane fraction and commingling it with the olefin-containing charging stock so that the combined feed to the polymerization reactors contains, for example, from 20 to 25 mole per cent of polymerizable olefins (propylene and butylene). Obviously, when processing a feed stock containing 60 per cent of polymerizable olefins, it is necessary to recycle a large amount of deolefinized exit gas and to pass through the polymerization catalyst zone an amount of combined feed which is about six times the quantity of fresh feed. In this type of operation, the fractionator to which the effluent from the polymerization reactors is directed must handle a much larger volume of material than would be the case if less de-olefinized gas were recycled. Thus the fractionator which must handle total reactor effluent would have to be approximately six times the size of the fractionator which would be required if it were possible to process the fresh feed without dilution by recycle stock. Because of the need for extra fractionation equipment, a chamber-type polymerization plant loses its low cost feature when operating on feed stocks containing more than about 35 mole per cent of polymerizable olefins.

This situation is improved and the utility of the chamber-type polymerization unit is extended by employing a combined modification in plant design and operating procedure as set forth herein. According to this invention, improved control of the polymerization reaction is obtained by limiting the depth or thickness of the initial catalyst bed or section, of the polymerization plant. By so limiting the thickness of this catalyst section, it is possible to limit the amount of polymerization which takes place therein and thereby to limit the temperature rise occurring in the first catalyst bed. Excessive temperature rise in the first catalyst bed results in catalyst dehydration, formation of coke, or other heavy hydrocarbonaceous materials, high pressure drop, and eventual plugging of the first catalyst reactor. By thus obtaining control of the rise in temperature that occurs in the first bed or section of catalyst, it is possible thereafter to control the temperatures of subsequent catalyst beds by controlling their depths or thicknesses and also by the injection of liquid quenching stock, preferably total effluent from the catalyst reactors, said liquid quenching stock being directed between catalyst beds or between catalyst reactors. By means of this method of limiting the depths of the different catalyst beds, and of recycling a portion of the total effluent, it is possible to polymerize a substantial proportion of the olefins from feed stocks containing up to about 60 per cent of polymerizable olefins using reasonable amounts of quenching stock. Other suitable quenching stocks include portions of the fresh feed stock to the polymerization zones and also fractionator overhead which is essentially a $C_3$–$C_4$ fraction of low olefin content. Thus by employing the process of this invention, the utility of the chamber-type polymerization plant can be extended so that it can be used economically in combination with catalytic cracking operations, which produce gases of high olefin content.

The character of the present process is indicated in more detail by reference to the attached Figures 1 and 2 which show diagrammatically in general side elevations two arrangements of interconnected elements in which operations falling within the scope of this invention may be carried out. The drawings, however, do not represent all of the modifications of this invention that may be employed.

Referring to Figure 1, a charging stock, for example, a so-called $C_3$–$C_4$ fraction containing propane, propylene, butanes and butylenes is introduced through line 1 and valve 2 to pump or compressor 3, which discharges through line 4 and valve 5 to coil 6 which receives heat from heater 7 and then passes through line 8, valves 9 and 10 to reactor 11 containing a bed or section or particles of a solid polymerizing catalyst maintained at a temperature of from about 400° to about 500° F. and at a pressure of from about 100 to about 2000 pounds per square inch. A portion of the $C_3$–$C_4$ fraction being discharged by pump or compressor 3 through line 4 may be directed therefrom through line 12 containing valve 13 to heat exchanger 14 which receives heat from the reaction products of the process as hereinafter set forth, and is thence directed through line 15 and valve 16 to line 4, already mentioned, and thence through heating coil 6.

Reactor 11 is the first of a series of reactors and subsequent reactors of the series are of increasing length in the direction of flow through the series. For example, reactor 11 is of such a length that the catalyst bed therein has a thickness of 2 feet while reactors 19, 22 and 25 are of such lengths that the catalyst beds therein have thicknesses or depths of 3, 5 and 8 feet. From reactor 11 the mixture of polymers and unconverted charging stock resulting from the polymerization reaction therein is directed through line 17 and valve 18 to reactor 19 and the effluent from this reactor is passed through line 20 and valve 21 to reactor 22. From reactor 22, the mixture of unconverted hydrocarbons and polymers is passed through line 23 containing valve 24 to reactor 25. Also line 8 is connected through by-pass line 26 containing valve 27 to line 17 and thence to reactor 19 so that the hydrocarbon mixture charged to the process may be passed directly to reactor 19 in case reactor 11 becomes plugged or otherwise rendered inoperable by accidental misoperation as by the admission thereto of liquid water with the steam added to prevent dehydration of the catalyst as hereinafter set forth.

From reactor 25, the effluent comprising olefin polymers and unconverted $C_3$–$C_4$ fraction is directed therefrom through line 28 and valve 29 to fractionator 30. A portion of the mixture of polymers and unconverted $C_3$–$C_4$ fraction is passed from line 28 through line 31, valve 32, to pump 33 which discharges through line 34 to heat exchanger 14, and line 35 containing valve 36. A portion of the mixture of polymers and unconverted charging stock contained in line 35 is passed therefrom through header 37 and valve 38 into line 23 by which the effluent from reactor 22 is conducted to reactor 25. Another portion of the material contained in header 37 is passed through branch line 39 and valve 40 into line 20. The mixture of polymers and unconverted charging stock is thus recycled and blended with the polymerization products from each reactor before being charged to the next reactor in the series of polymerization reactors in such amounts as to maintain the polymerization temperature between about 400° and 500° F.

When employing solid phosphoric acid polymerization catalyst, the hydrocarbon containing mixtures that are directed to the several reactors of the series such as reactors 11, 19, 22 and 25 as herein set forth are also commingled with controlled amounts of steam or water vapor in order to maintain the catalyst at a desired state of hydration and thereby to assist in maintaining catalyst activity at a relatively high value for long periods of time. Steam or water vapor is accordingly directed under pressure through header 41, valve 42 to line 23 and thence to reactor 25. Header 41 is also connected through branch line 43 and valve 44 to line 8, through branch line 45 and valve 46 to line 17 and through branch line 47 and valve 48 to line 20. Steam or water vapor is thus commingled with the mixture of hydrocarbons directed to each of the catalyst reactors 11, 19, 22 and 25. The amount of steam or water vapor (from about 0.2 to about 3.5 mole per cent of the hydrocarbon charged) directed to each of these reactors is governed by the operating temperatures in each of these reactors, less water vapor being needed at the lower polymerizing temperatures than that required at the higher polymerizing temperatures in order to maintain the solid phosphoric acid catalyst at a desired degree of hydration so as to decrease the coke formation and increase the life of the catalyst.

Fractionator 30 to which the effluent from the polymerization reactors (except that which is recycled) is directed, is provided with reboiler coil 49 which is supplied with heat from a source not illustrated in the drawing and is employed to effect a separation between the normally gaseous and normally liquid constituents of the material charged thereto. From the top of fractionator 30 a $C_3$–$C_4$ fraction of relatively low olefin content is directed through line 50 and valve 51 to condenser 52, from which the resultant mixture of liquid and vapors is directed through rundown line 53 and valve 54 to receiver 55 provided with gas release line 56 containing valve 57 and with liquid drawoff line 58 containing valve 59. A portion of the liquefied material contained in receiver 55 is withdrawn therefrom through line 60 and valve 61 to pump 62 which discharges through line 63 and valve 64 to near the top of fractionator 30, to assist in controlling the temperatures therein. From the bottom of fractionator 30, the normally liquid polymers substantially free from unconverted $C_3$–$C_4$ hydrocarbons, are discharged through line 65 and valve 66 to storage or to use not illustrated in the diagrammatic drawing.

Alternative polymerizing equipment having a catalyst reactor provided with a plurality of catalyst beds of different and increasing thickness or depth in the direction of flow through said reactor is illustrated diagrammatically in the attached Figure 2. According to this modification of the invention an olefin-containing hydrocarbon fraction, for example, a $C_3$–$C_4$ fraction of paraffins and olefins is directed through line 67 and valve 68 to pump or compressor 69 which discharges through line 70 and valve 71 to heating coil 72 which receives heat from heater 73 and from which the heated hydrocarbon mixture is passed through line 74 and valve 75 to reactor 76, containing a plurality of catalyst beds or sections indicated diagrammatically as four, each of these catalyst beds or sections being supported by a screen or other suitable means indicated in the drawing by screens 77, 78, 79, and 80. These screens or other supporting means are spaced at such intervals in reactor 76 that the catalyst beds or sections supported thereon are relatively thin near the inlet of the reactor and are progressively thicker near the exit of said reactor. For example, catalyst beds supported by screens 77, 78, 79 and 80 may be arranged to have the respective thicknesses of 2, 3, 5 and 8 feet.

When using solid phosphoric acid catalyst, it is generally advisable to commingle the charging stock with regulated amounts of steam or water vapor in order to maintain the hydration state of the catalyst necessary for high polymerizing activity and long catalyst life. Thus, in order to provide for hydration of the catalyst, steam under pressure is introduced through header 81, containing valve 82, to the last catalyst bed or section of reactor 76. Hydration of the catalyst in the other reactor sections of reactor 76 is maintained by directing a position of the steam or water vapor from header 81 through branch line 83 containing valve 84, branch line 85 containing valve 86, and branch line 87 containing valve 88.

From the exit end of reactor 76, a portion of the resultant mixture of polymers and unconverted $C_3$–$C_4$ fraction is discharged through line 89 and valve 90 to fractionator 91 and another portion of the mixture of polymers and unconverted $C_3$–$C_4$ fraction being discharged through line 89 is directed therefrom through line 92 and valve 93 to pump 94 which discharges through line 95, valve 96, and heat exchanger 97 into header 98 containing valve 99. In heat exchanger 97, the mixture of polymers and unconverted $C_3$–$C_4$ fraction which is at a polymerizing temperature gives up a portion of its heat to a portion of the charged $C_3$–$C_4$ fraction which is directed from line 70 through branch line 100, and valve 101, to heat exchanger 97 and thence through line 102 and valve 103 to line 70 already mentioned and which is connected to heating coil 72. From heat exchanger 97, the cooled mixture of polymers and unconverted $C_3$–$C_4$ fraction is passed through header 98 and valve 99 and through branch line 104 to valve 105, and branch line 106 containing 107, to reactor 76 to assist in controlling the polymerization temperature in each of the catalyst beds subsequent to the first catalyst bed. Line 74 is also connected through by-pass line 108 and valve 109 to header 98 so that the hydrocarbons charged to the process may be passed directly to the second catalyst zone in reactor 76 in case the first catalyst zone which is supported by screen 77 becomes clogged or otherwise rendered inoperative.

Heat needed for fractionating the mixture of polymers and unconverted $C_3$–$C_4$ fraction in fractionator 91 is supplied by reboiler coil 110 through which steam or some other heating fluid is supplied from a source not indicated in the diagrammatic drawing. Unconverted $C_3$–$C_4$ hydrocarbon vapors in fractionator 91 are directed therefrom through line 111 and valve 112 to condenser 113 from which liquefied hydrocarbons or a mixture of liquefied hydrocarbons and vapors is directed through rundown line 114 and valve 115 to receiver 116 provided with gas release line 117 containing valve 118 and also with liquid drawoff line 119 containing valve 120. A portion of the liquefied material in receiver 116 is directed therefrom through line 121 and valve 122 to pump 123 which discharges through line 124 and valve 125 to near the top of fractionator 91 to assist in controlling the temperatures therein. Polymers so separated from unconverted $C_3$–$C_4$ hydrocarbons in fractionator 91 are directed therefrom through line 126 and valve 127 to cooling and/or storage not indicated in the diagrammatic drawing.

The nature of the present invention is indicated further by the following example which should not be construed to limit unduly the broad scope of the invention.

A plant of the general character described in connection with Figure 1 is utilized to polymerize a $C_3$–$C_4$ fraction containing about 30 mole per cent of propylene and 25 mole per cent of butylenes including isobutylene and normal butylenes. The charge is preheated to a temperature of 400° F. and passed in series through the four reactors each containing a fixed bed of 5 x 5 mm. pellets of solid phosphoric acid catalyst. A portion of the effluent from the last catalyst reactor is partially cooled by exchanging heat with a portion of the fresh feed in heat exchanger 14 and then the cooled effluent is commingled with the effluent from each of the catalyst reactors before this material is passed to the next catalyst reactor in the series of four reactors indicated in Figure 1. In reactor 1 the catalyst temperature increases from 400° F. at the inlet to about 470° F. at the outlet where it is commingled with sufficient partially cooled recycle stock to lower the temperature of the mixture to about 400° F. at which temperature the commingled mixture is introduced to the second reactor of the series. During passage through the second reactor, the temperature of the polymerization mixture increases from 400° F. to about 475° F. due to the exothermic heat of the polymerization reaction. The effluent from the second reactor is also commingled with a portion of cooled recycle stock so that the hydrocarbon mixture charged to the third reactor of the series enters that reactor at a temperature of about 400° F. and during passage through this reactor reaches a maximum temperature of about 480° F. due to the heat of polymerization. The effluent from this reactor is then mixed with sufficient recycle stock to lower the temperature of the resultant mixture to 400° F. at which it is charged to the fourth reactor in the series of four polymerization reactors, these reactors being of increasing length in the direction of flow through the polymerization plant. The amount of polymerization reactor effluent, including polymers and unconverted $C_3$–$C_4$ fraction, which is thus cooled by heat exchange with a portion of the fresh charging stock and is then recycled and commingled with the effluent from each of the different reactors to control the temperature of the reaction mixture before introducing it to the next reactor in the series of polymerization reactors is about 0.45 times the volume of fresh $C_3$–$C_4$ fraction charged to the process. Accordingly, the mixture of polymers and unconverted $C_3$–$C_4$ fraction which is directed from the last reactor of the series to the fractionating equipment has about 1.32 times the volume of the fresh $C_3$–$C_4$ fraction charged to the process.

When the polymerization is carried out at a pressure of 500 pounds per square inch an amount of steam corresponding to about 0.8 mole per cent of the total reaction mixture present in each of the reactors is introduced at points between the different reactors as indicated in the diagrammatic drawing in order to prevent excessive dehydration of the catalyst and accompanying loss of polymerizing activity.

A similar type of polymerizing treatment of a $C_3$–$C_4$ fraction containing 50–60 mole per cent of propylene plus butylenes is carried out in a plant of the general character referred to in Figure 2, in which the several catalyst beds of different thicknesses are contained in a single reactor although a plurality of such reactors may also be utilized. In this type of operation, a sufficient amount of the polymerization reactor effluent including polymers and unconverted $C_3$–$C_4$ fraction (mainly propane and butanes) is recycled and admitted to the polymerization reactor at points in advance of each of the several catalyst beds or sections following the first catalyst bed, in order to assist in controlling the temperatures therein. The temperature in the first catalyst bed is controlled by the amount of catalyst therein and the rate of flow of the charged hydrocarbon mixture therethrough.

I claim as my invention:

1. A process for producing polymers from a hydrocarbon fraction containing at least about 50 mole percent of olefins of higher molecular weight than ethylene, which comprises contacting said olefin-containing hydrocarbon fraction at polymerizing conditions with a solid polymerizing catalyst contained in a series of catalyst sections of increasing thickness in the direction of flow, cooling between catalyst sections by introducing a hydrocarbon quenching stock between said catalyst sections, fractionating hydrocarbon effluent from said catalyst sections to separate polymers and unconverted hydrocarbons, and recovering said polymers.

2. A process for producing polymers from a hydrocarbon fraction containing at least about 50 mole percent of olefins of higher molecular weight than ethylene, which comprises contacting said olefin containing hydrocarbon fraction at polymerizing conditions with a solid phosphoric acid polymerizing catalyst contained in a plurality of catalyst sections of increasing thickness in the direction of flow, cooling between catalyst sections by introducing a hydrocarbon quenching stock between said catalyst sections, fractionating hydrocarbon effluent from said catalyst sections to separate polymers and unconverted hydrocarbons, and recovering said polymers.

3. A process for producing polymers from a hydrocarbon fraction containing at least about 50 mole percent of olefins of higher molecular weight than ethylene, which comprises contacting said olefin-containing hydrocarbon fraction at polymerizing conditions with a solid polymerizing catalyst contained in a series of catalyst sections of increasing thickness in the direction of flow, cooling between catalyst sections by recycling thereto a portion of the total effluent from said catalyst sections including unconverted olefin-containing fraction and polymers, separating the unrecycled effluent into polymers and unconverted hydrocarbons, and recovering said polymers.

4. A process for producing polymers from a hydrocarbon fraction containing at least about 50 mole percent of olefins of higher molecular weight than ethylene, which comprises contacting said olefin-containing hydrocarbon fraction at polymerizing conditions of temperature and pressure with a solid phosphoric acid catalyst contained in a plurality of catalyst sections of progressively increasing thickness in the direction of flow, cooling between catalyst sections by recycling thereto a portion of the total effluent from said catalyst sections including unconverted olefin-containing fraction and polymers, separating the unrecycled effluent into polymers and unconverted hydrocarbons, and recovering said polymers.

5. A process for producing polymers from a hydrocarbon fraction containing at least about 50 mole percent of olefins of higher molecular weight than ethylene, which comprises contacting said olefin-containing hydrocarbon fraction at a temperature of from about 400° to about 500° F. with a solid phosphoric acid catalyst contained in a plurality of catalyst sections of increasing thickness in the direction of flow, cooling the gaseous and liquid effluent from said plurality of catalyst sections, recycling a portion of the cooled effluent to commingle with the hydrocarbon mixture in each of the catalyst sections after the first section to assist in controlling the temperatures therein, separating the remainder of the effluent into polymers and unconverted hydrocarbons, and recovering said polymers.

6. A process for producing polymers from a hydrocarbon fraction containing at least about 50 mole percent of olefins of higher molecular weight than ethylene, which comprises contacting said olefin-containing hydrocarbon fraction at a polymerizing temperature of from about 400° to about 500° F. with a solid phosphoric acid catalyst contained in a series of catalyst sections of increasing thickness in the direction of flow, cooling a portion of the effluent from said series of catalyst sections by heat exchange with at least a portion of the fresh olefin-containing charging stock, recycling the cooled effluent to each of the catalyst sections after the first section to assist in controlling the temperature therein, separating the effluent into polymers and unconverted hydrocarbons, and recovering said polymers.

7. An olefin polymerization process which comprises reacting at $C_3$–$C_4$ fraction containing at least about 50 mole percent of propylene and butylenes at a polymerization temperature of from about 400° to about 500° F. in the presence of a solid calcined composite of a siliceous adsorbent and a phosphoric acid contained in a plurality of catalyst sections of increasing thickness in the direction of flow, cooling a portion of the gaseous and liquid effluent from said plurality of catalyst sections, recycling a portion of the cooled effluent to commingle with the hydrocarbon mixture in each of the catalyst sections subsequent to the first section to assist in controlling the temperatures therein, separating the remainder of the effluent into polymers and unconverted $C_3$–$C_4$ fraction, and recovering said polymers.

8. An olefin polymerization process which comprises reacting a $C_3$–$C_4$ fraction containing at least about 50 mole percent of olefins at a temperature of from about 400° to about 500° F. and at a pressure of from about 100 to about 2000 pounds per square inch in the presence of a solid phosphoric acid polymerization catalyst contained in a plurality of catalyst sections of increasing thickness in the direction of flow, cooling a portion of the gaseous and liquid effluent from said plurality of catalyst sections, recycling a portion of the cooled effluent to commingle with the hydrocarbon mixture in each of the catalyst sections subsequent to the first section to assist in controlling the temperatures therein, introducing steam to commingle with the hydrocarbons in each of the catalyst sections to maintain the hydration and activity of the catalyst, separating the remainder of said effluent into polymers and unconverted $C_3$–$C_4$ hydrocarbons, and recovering said polymers.

9. A process for producing polymers from a hydrocarbon fraction containing more than about 35 mole percent of olefins of higher molecular weight than ethylene, which comprises passing said fraction at polymerizing temperature through a series of beds of solid polymerizing catalyst of increasing thickness in the direction of flow of the hydrocarbons therethrough, cooling the hydrocarbons between successive catalyst beds by commingling a hydrocarbon quenching medium therewith, and fractionating effluent products from the last catalyst bed of the series to separate polymers from unconverted hydrocarbons.

10. A process for producing polymers from a hydrocarbon fraction containing more than about 35 mole percent of olefins of higher molecular weight than ethylene, which comprises passing said fraction at polymerizing temperature through a series of beds of solid polymerizing catalyst of increasing thickness in the direction of flow of the hydrocarbons therethrough, cooling the hydrocarbons between successive catalyst beds by commingling therewith a portion of the effluent from the last catalyst bed of the series, said portion of the effluent containing polymers and unconverted hydrocarbons, and fractionating another portion of said effluent to separate its polymer content from unconverted hydrocarbons.

11. A process for producing polymers from a hydrocarbon fraction containing more than about 35 mole percent of olefins of higher molecular weight than ethylene, which comprises passing said fraction at polymerizing temperature through a series of beds of solid polymerizing catalyst of increasing volume in the direction of flow of the hydrocarbons therethrough, cooling the hydrocarbons between successive catalyst beds by commingling a hydrocarbon quenching medium therewith, and fractionating effluent products from the last catalyst bed of the series to separate polymers from unconverted hydrocarbons.

12. A process for producing polymers from a hydrocarbon fraction containing more than about 35 mole percent of olefins of higher molecular weight than ethylene, which comprises passing said fraction at polymerizing temperature through a series of beds of solid polymerizing catalyst of increasing volume in the direction of flow of the hydrocarbons therethrough, cooling the hydrocarbons between successive catalyst beds by commingling therewith a portion of the effluent from the last catalyst bed of the series, said portion of the effluent containing polymers and unconverted hydrocarbons, and fractionating another portion of said effluent to separate its polymer content from unconverted hydrocarbons.

13. The process of claim 11 further characterized in that said polymerizing catalyst is a solid phosphoric acid catalyst.

14. The process of claim 12 further characterized in that said polymerizing catalyst is a solid phosphoric acid catalyst.

WILLIAM B. SHANLEY.

REFERENCES CITED

The following references are of record in the file of this patent:

UNITED STATES PATENTS

| Number | Name | Date |
|---|---|---|
| 2,170,275 | Nelson | Aug. 22, 1939 |
| 2,176,354 | Nelson | Oct. 17, 1939 |
| 2,303,075 | Frey | Nov. 24, 1942 |
| 2,353,509 | Schulze et al. | July 11, 1944 |
| 2,353,832 | Kemp | July 18, 1944 |